United States Patent
Culver et al.

[15] 3,643,116
[45] Feb. 15, 1972

[54] FAST LOGIC USING ULTRASHORT LASER PULSES

[72] Inventors: William H. Culver, Washington, D.C.; Farrokh Mehran, Mohegan Lake, N.Y.

[73] Assignee: International Business Machines Corporation, Armonk, N.Y.

[22] Filed: Sept. 5, 1969

[21] Appl. No.: 855,607

[52] U.S. Cl. ............................................. 307/312, 330/4.3
[51] Int. Cl. ......................................................... H03k 19/14
[58] Field of Search ................................. 307/312; 331/94.5

[56] References Cited

UNITED STATES PATENTS

| | | | |
|---|---|---|---|
| 3,430,160 | 2/1969 | Kosonocky | 331/94.5 |
| 3,431,437 | 3/1969 | Kosonocky | 307/312 |
| 3,439,289 | 4/1969 | Kosonocky | 331/94.5 |
| 3,525,024 | 8/1970 | Kawaji | 317/234 |

OTHER PUBLICATIONS

IBM, Vol. 7, 11 April 1965, "Solid State Exclusive or Device" IEEE Spectium March 1965. Progress in Optical Computer Research, pp. 181–195

Primary Examiner—Rodney D. Bennett, Jr.
Assistant Examiner—N. Moskowitz
Attorney—Hanifin and Jancin and Jackson E. Stanland

[57] ABSTRACT

Logical elements are formed using resonant multilevel media and short laser pulses. Ultrashort laser pulses propagate through the media and interact with the media. The change in the state of the medium is described by the angle through which the pseudodipole moment rotates about the direction of the electric field. This same angle is used for describing the pulse. Using various combinations of resonant media and zero and $\pi$ laser pulses as the binary elements, logical connectives, such as AND, OR, etc., are fabricated.

17 Claims, 14 Drawing Figures

| | A | B | S' | C' |
|---|---|---|---|---|
| 1 | 0 | 0 | 0 | 0 |
| 2 | 0 | $\pi$ | $\pi$ | 0 |
| 3 | $\pi$ | 0 | $\pi$ | 0 |
| 4 | $\pi$ | $\pi$ | 0 | $\pi$ |

PATENTED FEB 15 1972 3,643,116

INVENTORS
WILLIAM H. CULVER
FARROKH MEHRAN

BY J.E. Stanlun

AGENT

FIG. 2A

AND CONNECTIVE

FIG. 2B

| | A | B | C | D | E |
|---|---|---|---|---|---|
| 1 | 0 | 0 | 0 | 0 | 0 |
| 2 | $\pi$ | 0 | 0 | 0 | 0 |
| 3 | 0 | $\pi^-$ | $\pi^-$ | 0 | 0 |
| 4 | $\pi$ | $\pi^-$ | $\pi^+$ | $2\pi$ | $\pi$ |

OR CONNECTIVE

FIG. 3B

| | A | B | C | D | E | F | G |
|---|---|---|---|---|---|---|---|
| 1 | 0 | 0 | $\pi^-$ | $\pi^-$ | $\pi^-$ | 0 | 0 |
| 2 | 0 | $\pi$ | $\pi^-$ | $\pi^{-+}$ | $\pi^+$ | $2\pi$ | $\pi$ |
| 3 | $\pi$ | 0 | $\pi^-$ | $\pi^{-+}$ | $\pi^+$ | $2\pi$ | $\pi$ |
| 4 | $\pi$ | $\pi$ | $\pi^-$ | $\pi^{-+}$ | $\pi^+$ | $2\pi$ | $\pi$ |

FIG. 4A  NOT CONNECTIVE

FIG. 4B

|   | A | B | C | D | E | F |
|---|---|---|---|---|---|---|
| 1 | 0 | $2\pi$ | $2\pi$ | $\pi^+$ | $2\pi$ | $\pi$ |
| 2 | $\pi$ | $2\pi$ | $2\pi^-$ | $\pi^-$ | 0 | 0 |

EXCLUSIVE OR

|   | A | B | C | D | E | F | G |
|---|---|---|---|---|---|---|---|
| 1 | 0 | 0 | $\pi^-$ | $\pi^-$ | $\pi^-$ | 0 | 0 |
| 2 | $\pi$ | 0 | $\pi^-$ | $\pi^+$ | $\pi^+$ | $2\pi$ | $\pi$ |
| 3 | 0 | $\pi$ | $\pi^-$ | $\pi^+$ | $\pi^+$ | $2\pi$ | $\pi$ |
| 4 | $\pi$ | $\pi$ | $\pi^-$ | $\pi^-$ | $\pi^-$ | 0 | 0 |

FAST LOGIC USING ULTRASHORT LASER PULSES

BACKGROUND OF THE INVENTION

1. Field of the Invention

This invention relates to logical connectives, and more particularly to logical connectives comprising elements of resonant, multilevel media and narrow laser pulses.

2. Description of the Prior Art

Present day computers are electronic but there have been several discussions of optical computers. The basic advantage of an optical computer, or at least the use of lasers in different parts of a computer, is speed. With the most advanced electronic computers nanoseconds are required for a single logic operation. However, with suitable optical units, operation in picoseconds ($10^{-12}$ seconds) or less is possible. The possibility of achieving such high speed logic operations with optical pulses arises because short coherent pulses of high frequency can be utilized. Such pulses have been produced and mode locked lasers in Q-switched lasers.

Another advantage relates to size. Theoretically, it is possible to reduce the size of an optical logic element to an amount less than that for electronic logical elements. Very small optical wave guides (approximately one micron) have been developed for this purpose. Also, optical absorption of an element can be regulated, so that the size of the element can be reduced while still providing desirable properties.

Still another advantage of optical computers relates to the amount of energy involved in a logic operation. With transistor logical elements, a minimum of approximately $10^{-10}$ joules per logical operation is required. However, with optical logic elements the theoretical limit is much lower, and in the ultimate will approach $10^{-19}$ joules, which is the energy of a single visible photon. Of course, due to the many circuits in a computer, either electronic or optical, the total energy involved is multiplied considerably.

A further advantage of an optical computer results from the possibility of electromagnetically cooling the computer switching elements. That is, heat which is developed within the logic elements can be brought out before it is transferred to the lattice. An excited electron in an optical element will either decay spontaneously to produce a quantum of noise, or energy will be transferred to phonons resulting in a buildup of heat energy in the lattice (radiation-less transfer). With an optical laser computer, it is possible to bring an excited atom down to the ground state by a coherent beam of light ($\pi$ pulse) which will interact with the excited atom to produce radiation (stimulated) which in turn can be guided out of the system. This is controllable, given direction, polarization, phase, and frequency. Since the stimulated emission exits in the direction of the input pump pulse, an optical wave guide can be used to remove this energy. With an electronic computer element, such as a transistor, this is not possible and sufficient cooling often requires cryogenic environments. The real advantage of electromagnetic fast cooling is that the duty cycle of operations can be increased. This increases the overall speed of the computer.

A prior technique for achieving laser logic uses a semiconductor laser in combination with a nonlinear optical absorber. Such a device may be, for example, a quenching laser and a quenched laser. The output of the quenching laser is incident upon the quenched laser in order to change its stable state. This laser logic element has two stable states, lasing and nonlasing, which can be switched from one state to the other by an optical input.

There are various shortcomings to an optical logical device having a semiconductor laser in combination with a nonlinear optical absorber. One disadvantage is that each logical step (i.e., AND, OR, etc) involves a laser element. Since, in order to have a laser element, optical cavities are required, this scheme becomes more complex and involves a greater amount of hardware. Also, because lasing is required, greater input energies are needed.

Another disadvantage of the laser-absorber combination is in the relatively large size involved. The approximate size of such a laser-absorber combination is 1 mil.

In addition, the energy required for the laser-nonlinear absorber is greater since each laser must be driven to exceed its threshold, in order that lasing will occur. This type of system does not compete favorably with electronic systems in this particular regard.

Another limitation on the laser-nonlinear absorber combination involves its speed. The speed of this device is limited by the quenching time required for one laser to turn off another laser. This means that speeds of the order of several transit times are necessary.

The laser-optical absorber combination has been used to produce only a NOT gate, rather than all logical connectives. In order to be more useful, an optical device must be capable of performing all logical connectives, rather than being just a gate to provide signal flow or not.

Another disadvantage of the semiconductor laser-nonlinear optical absorber combination is that such a combination requires a cryogenic environment for operation. This is so because many laser elements are involved and, in order to exceed the laser threshold, sufficient current is required. Such currents are most readily available in low temperature environments. In order to minimize the amount of hardware required and the overall complexity of the system, it is desirable that the logical connectives operate at room temperature.

Consequently, it is apparent that the above existing optical logic elements are restricted in their usefulness due to high power requirements, lack of utility in a variety of logical connectives, limited speed, and the requirement for low temperature environments.

Accordingly, it is a primary object of this invention to provide true optical logic connectives which can be used to perform any desired logical operation.

Another object is to provide optical logic connectives which are extremely fast.

A further object is to provide optical logic connectives which are extremely small in size and simple in design and operation.

Another object of this invention is to provide optical logic connectives which will operate successfully at room temperature.

Another object is to provide optical logic connectives having improved cooling, which connectives can be operated with very little heat dissipation.

The foregoing and other objects, features, and advantages of the invention will be apparent from the following more particular description of the preferred embodiments of the invention, as illustrated in the accompanying drawings.

SUMMARY OF THE INVENTION

In logic operations the components of the operations are called bits and the mechanism which performs the operations are called switches. In this invention, the bits are coherent laser pulses and the switches are resonant media having energy separations equal to a multiple of the laser pulse frequency.

In these logic elements, a strong narrow pulse of coherent light propagates through a resonant two level medium and interacts with the pseudodipole moments of the medium. These narrow pulses are pulses which have a duration less than the relaxation times of the medium. The pseudodipole moment is a three-dimensional vector whose first two components are the dispersion and the absorption components of the induce dipole moment, and whose third component is a measure of departure of the state of the medium from thermal equilibrium. The pseudodipole moment is rotated and reacts back on the laser pulse to modify it. The change in state of the medium can be characterized by the angle through which the pseudodipole moment rotates. This same angle can be used for describing the pulse. The angle is not a measure of the energy content of the pulse and the description of a pulse by this angle does not completely specify the pulse.

Because the rotation of the pseudodipole moment modifies the incoming pulse, it is possible to construct switching elements which perform logic operations, upon the incidence of one or more input pulses. In a logical connective, such as an AND, OR, NOT, etc., a first resonant medium functions as a switching element, to modify the condition of the incident coherent laser pulse. A second resonant medium is then utilized to analyze the outputs of the first resonant medium. If the pulse is to continue to another logical stage, a third resonant medium is utilized for coupling the output pulses of the second resonant medium to this succeeding stage. The resonant media are pumped or unpumped depending upon whether or not they must be in an excited or unexcited state. To pump such media, auxiliary inputs can be utilized or the input laser pulse can be utilized.

The logical connectives of this invention utilize coherent laser pulses having durations shorter than the relaxation time of the resonant media stages of the logical connectives. The connectives themselves consist of various stages of two level media which are resonant with the input laser pulses. These media provide switching and analyzation functions. The various resonant media are pumped or unpumped depending upon whether they are to be in the excited state or the unexcited state. The coherent input laser pulses interact with the pseudodipole moments of the media to rotate such pseudodipole moments. The laser pulses are modified by this interaction and output pulses indicative of the various logical operations to be performed are produced. Self-induced transparency, by which short pulses of coherent light are able to pass through an optically resonant medium as though the medium where transparent, is used to provide logical devices. In order to use this effect, the pulses must be of sufficient energy that they themselves can excite the resonant media.

DESCRIPTION OF THE PREFERRED EMBODIMENT

In this invention, ultrashort laser pulses are used for designing logic systems which are more than a thousand times faster than present-day systems. At present, the shortest time for a single-logical operation is of the order of one nanosecond. Use of ultrashort laser pulses makes it possible to do logic operations in less than a picosecond. Also, these picosecond pulses are flexible and standardizable, and are therefore useful in computer applications. The laser pulses interact with a medium which has a resonant frequency equal to the frequency of the laser pulse. All logical connectives can be constructed using two or three pulses and a resonant medium. In this manner, it is possible to avoid the use of several basic connectives in order to obtain a single logical operation.

Logical Connectives

In order to perform an arithmetical operation by a computer, one or more stages of logical connectives are used. The table below shows a complete set of logical connectives for two binary inputs. The first two rows are the two inputs A and B. The other 16 rows are the 16 possible outputs forming a complete set of logical connectives.

TABLE I - LOGICAL CONNECTIVES

| Input A | 1 | 1 | 0 | 0 |
|---|---|---|---|---|
| Input B | 1 | 0 | 1 | 0 |
| Zero | 0 | 0 | 0 | 0 |
| NOR | 0 | 0 | 0 | 1 |
| A<B | 0 | 0 | 1 | 0 |
| A>B | 0 | 1 | 0 | 0 |
| AND | 1 | 0 | 0 | 0 |
| NOT A | 0 | 0 | 1 | 1 |
| NOT B | 0 | 1 | 0 | 1 |
| If & Only If | 1 | 0 | 0 | 1 |
| Exclusive OR | 0 | 1 | 1 | 0 |
| A | 1 | 1 | 0 | 0 |
| NAND | 0 | 1 | 1 | 1 |
| A ≤ B | 1 | 0 | 1 | 1 |
| A ≥ B | 1 | 1 | 0 | 1 |
| OR | 1 | 1 | 1 | 0 |
| ONE | 1 | 1 | 1 | 1 |

There are several subsets which form a complete set by themselves in the sense that any connective can be constructed using only the members of the subset. One such subset is the AND, OR, and NOT subset. This is the subset which is most often used in logic design and is the one illustrated by the drawings and specification. In addition, either NOR or NAND is also a complete subset by itself. In order to form any connective out of a subset several stages of combinations are required. Using stable coherent laser pulses each connective can be constructed separately using only a small piece of resonant medium. The connectives AND, OR, NOT, and EXCLUSIVE OR will be described in the specification to follow.

THEORETICAL DISCUSSION

In order to more fully understand the mechanism of self-induced transparency, a brief explanation will now be given. For a more comprehensive description of this effect, reference can be made to an article by S. L. McCall and E. L. Hahn entitled "Self-induced Transparency By Pulsed Coherent Light," which article appears in PHYSICAL REVIEW LETTERS, Vol. 18, No. 21, 22 May 1967, at page 908.

Figure 1A:
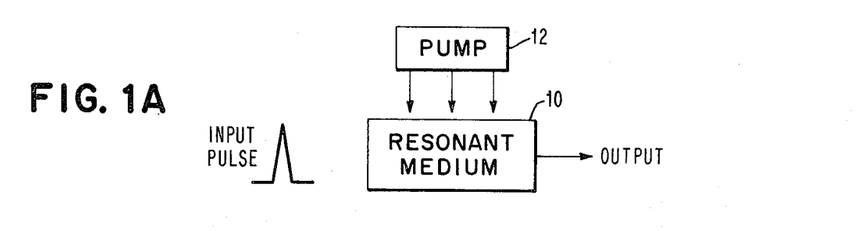
FIG. 1A is a schematic diagram of a logic device with an optical pulse incident thereupon, in which the effect of self-induced transparency occurs.

Referring to FIG. 1A, a schematic diagram illustrates a coherent laser input pulse which is incident upon a resonant two level medium 10. The medium may, of course, have more than two energy states, but there are at least two states having an energy separation corresponding to the product $\hbar \nu$, where $\nu$ is the frequency of the input laser pulse and $\hbar$ is Planck's constant divided by $2\pi$. The resonant medium 10 is in either the ground state or an excited state, depending upon whether or not it is pumped by electromagnetic energy from pump 12. Further, there is an output or not depending upon the nature of the input pulse and the state of the resonant medium. In order for self-induced transparency to occur, the input pulse must be of sufficient energy and must be a pulse shorter than the relaxation times of the resonant medium. The energy required depends on a number of factors and for a $\pi$ pulse is given by the expression $\Sigma = (2\pi^3 \eta^2 ch A)/(3\lambda^3 \tau W)$ where $\lambda$ is the wavelength of the light $c$ is the speed of light $h$ is Planck's constant $A$ is the cross-sectional area of the pulse $\tau$ is the duration of the pulse $W$ is the electric dipole transition probability $\eta$ is the index of the refraction of the medium.

When a strong narrow laser pulse of coherent light propagates through a resonant two level medium it interacts with the pseudodipole moments of the medium. A narrow pulse is one which has a short duration compared to the relaxation times of the medium. The pseudodipole moment is a three-dimensional vector whose first two components are the dispersion and absorption components of the induced dipole moment, and whose third component is a measure of departure of the state of the medium from thermal equilibrium.

Before the arrival of the laser pulse in the resonant medium, the medium is in thermal equilibrium, each ion being in one or the other of two energy levels. The distribution of the ions in the two energy levels is given by Boltzmann's law. At equilibrium, the medium does not have a permanent electric dipole moment. The electric dipole moment is an odd operator and has zero expectation value for either of the two eigenstates of the Hamiltonian operator. Once the laser pulse starts interacting with the resonant medium, each ion is put into a coherent superposition of the two energy states of the unperturbed Hamiltonian, and an electric dipole moment is induced in the system. This occurs because the dipole operator has a nonzero matrix element between the two energy levels. If the relaxation times of the medium are long compared to the duration of the pulse, the coefficient of the coherent superposition of the energy levels develops smoothly in time and the macroscopic pseudodipole moment moves continuously in its space. During its rotation, the pseudodipole moment reacts back on the pulse and modifies it. The time development of the pulse can be described by Maxwell's equations with the induced dipole moment appearing as a source term. The state of the ions may be described by Schrodinger's equation with the electric field of the pulse appearing as a perturbing parameter in the Hamiltonian operator. The change in the state of the medium can be characterized by the angle through which the psuedodipole moment rotates about the direction of the electric field. That is, as a result of the interaction of the input laser pulse and the induced pseudodipole moment, the shape and the energy of the laser pulse as well as the state of the medium are changed. The change in the state of the medium can be described by the angle through which the pseudodipole moment rotates about the direction of the electric field.

For a coherent plane wave which is circularly polarized, (1) $E(z, t)=E_0(z, t) [i \cos(\omega t-kz)-j \sin(\omega t-kz)]$ Here the electric field $E$ propagates in the $z$ direction with frequency $\omega$, $k=2\pi\eta/\lambda$, $\lambda$ = the vacuum wavelength, and $\eta$ is a constant host-medium refractive index. The electric dipole moment $p$ is turned through a net angle $$\theta(z) = k \int_{-\infty}^{x} E(z, t) dt \qquad (2)$$

Where: $E$ is the amplitude of the electric field $k=2p/h$ $p=$ matrix element of the dipole moment operator between the two energy levels of the medium. The laser pulse propagates in the $z$ direction.

This same angle can be used for describing the laser pulse. Thus a $\theta(z)$ pulse is a pulse that has the capability of rotating the pseudodipole moment to an angle $\theta$ at point $z$. The angle $\theta$ is not a measure of the energy content of the pulse and the description of a pulse by the angle $\theta$ does not completely specify the pulse.

For large coherent light intensities, $$\frac{d\theta}{dz} = -\frac{\alpha}{2} \sin \theta \qquad (3)$$

Figure 1B:
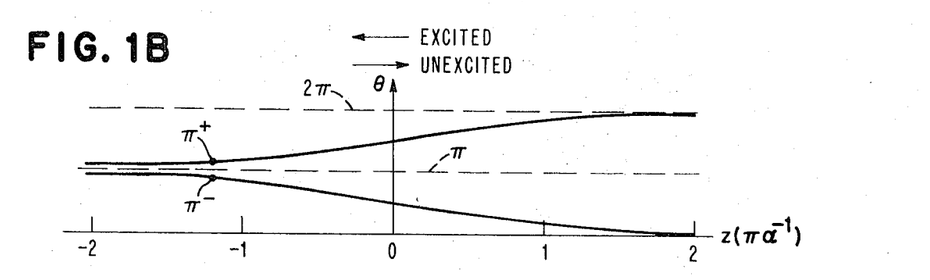
FIG. 1B is a graphical solution of the equation describing the angle through which the pseudodipole moment of the medium rotates when self-induced transparency occurs in the device of FIG. 1A.
Figure 1C:
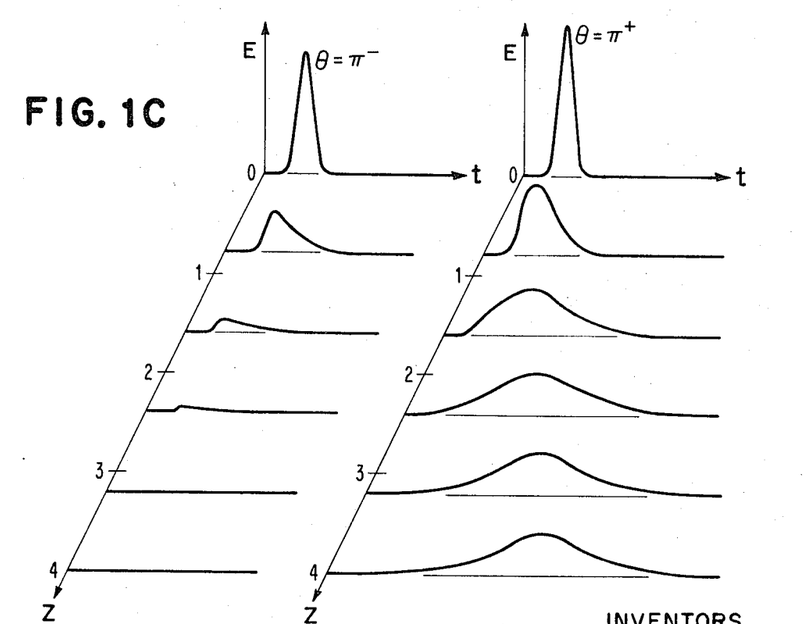
FIG. 1C is a graphical representation of the effect of a resonant medium upon an optical pulse, when self-induced transparency occurs.

This equation has the solution (4) $\text{Tan } \frac{1}{2} \theta(z)=(\tan \frac{1}{2} \theta_0) \exp(-\frac{1}{2}\alpha z)$ FIG. 1B shows the branch solution of $\theta$ vs. $z$ from Eq. 4. An example of numerical values of the electric field amplitude of the laser pulse vs. $z$ and $t$ are shown in FIG. 1C.

In order to more fully understand the diagram of FIG. 1B, the following numerical estimates are presented. The energy density of the laser pulses is given by $$\Sigma = \frac{cn}{4\pi} \int E^2 dt \qquad (5)$$

where $n=$ index of refraction of the medium. The total power is:

$$P = \frac{cn}{4\pi} E^2 A \qquad (6)$$

where $A$ is the cross-sectional area of the laser pulse. From equation (2), the condition for a $\pi$ pulse is (7) $\theta(z)=\pi=kE\tau$ where: $\tau$ is the duration of the pulse. The probability for an electric dipole transition is given by (8) $W=(64\pi^4 np^2)/(3\lambda^3 h)$ where $\lambda$ is the wavelength of the laser light. Combining equations 6, 7, and 8, the following expression for the total power is obtained: (9) $P=(2\pi^3 n^2 chA)/(3\lambda\tau^2 W)$ Referring to FIG. 1B, the branch solutions of $\theta$ vs. $z$ are shown, with the origin at $Z=0$. For the resonant medium in the excited state, $\theta$ evolves in $-z$ direction, as shown by the arrow at the top of the drawing. For the resonant medium in an initially unexcited state, $\theta$ evolves in the $+z$ direction, which is also shown by an arrow at the top of the drawing. Units of $z$ are multiples of $\pi\alpha^{-1}$ where $\alpha$ is the absorption coefficient of the medium.

Referring to FIG. 1B, two branch solutions are shown, one for a $\pi^+$ pulse and the other for a $\pi^-$ pulse. For an initial pulse area $\theta_0 < \pi$, below the critical area at $\theta_0=\pi$, the pulse area diminishes toward $\theta(z)=0$ for increasing $z$. This decrease in pulse area approaches the limit of 0 asymptotically.

Reference to FIG. 1C illustrates this more clearly. That is, the $\theta=\pi^-$ pulse having an amplitude E diminishes over a few absorption lengths to a value of zero, or substantially zero.

Again referring to FIG. 1B, a $\theta=\pi^+$ pulse increases in area toward the limit $2\pi$, when $d\theta/dz=0$. Since $\theta(z)$ is proportional to the $\int E dt$, the pulse will lose some energy over a number of absorption lengths $\alpha^{-1}$ and is reshaped. This final pulse energy is conserved because any optical ion is momentarily excited from its ground state to a coherent superposition of ground and excited energy states. The optical ion is then returned completely to its ground state after the $2\pi$ pulse has passed. Hence, pulse retardation occurs occurs since the pulse is depleted in energy at its leading time edge during absorption, but the absorbed energy is returned to the trailing edge during emission.

Referring to FIG. 1C, it is apparent that the $\theta=\pi^+$ pulse increases in area although it loses some energy over a number of absorption lengths, and is reshaped.

The diagram of FIG. 1B depends upon the total medium being excited, not just a small number of atomic layers. Normally, neither a zero pulse or a $2\pi$ pulse will excite a medium. A $\pi$ pulse will excite a medium better than any other pulse, although other pulses will also excite the resonant media. Further, a $\pi$ pulse will bring an excited medium down to the ground state.

Referring to FIGS. 1B and 1C, a thin medium is one in which only a small portion of an absorption unit is involved. A thick medium is one in which a number of absorption lengths is included, and is one which will change an input pulse to a zero pulse or a $2\pi$ pulse. In this specification, a $\pi$ pulse will usually be mentioned, although it is to be understood that either a $\pi^-$ or a $\pi^+$ pulse may be the pulse which is actually present in the system.

With the above characteristics in mind, certain properties of a medium are apparent. Among these are the following:

absorbing medium (ground state) - if a pulse exits from such a medium it must be a $2\pi$ pulse, provided that the medium is long enough.

excited medium - a pulse exiting from an excited medium is a $\pi$ pulse, provided that the medium is long enough.

detection of $\pi^-$, $\pi^+$ pulses - if these pulses are put through an absorbing medium (i.e., an unexcited medium), the $\pi^+$ pulse will be converted to a $2\pi$ pulse (physical pulse output), while the $\pi^-$ pulse will be converted to a zero pulse (no physical output).

The above properties involving self-induced transparency and the interaction of coherent laser pulses with induced dipole moments are used to provide laser logic. Specifically, the binary bits are the pulses of light themselves, a "one bit" being a $\pi$ pulse while a "zero bit" is a zero pulse.

INITIAL GENERATION OF $\pi$ PULSES

The initial generation of a $\pi$ pulse is quite straightforward. Referring to FIG. 1B, it is apparent that if any pulse is passed through an amplifier it will be converted to a $\pi$ pulse. This follows by reading FIG. 1B in a direction from right to left as indicated by the arrow denoting the reading direction for an excited medium. By adjusting the parameters of the initial laser signal source a $\pi^-$ or a $\pi^+$ pulse can be formed.

A laser can produce any kind of pulse. The energy output of the laser can be adjusted by adjusting the input pump energy into the laser. This changes the angle $\theta$ referred to previously. Knowing that a $\pi^-$ pulse will disappear upon passing through an unexcited medium (refer to FIG. 1B) an absorbing medium can be used in conjunction with the initial signal generating laser. As soon as the pulse disappears upon passing through the unexcited medium, it is then established that the laser is generating $\pi^-$ pulses.

DETECTION OF OUTPUT PULSES

As mentioned above, self-induced transparency is a phenomenon by which the initial input pulses interact with the resonant medium and are themselves changed. With an absorbing medium (unexcited medium), if a pulse exits it must be a $2\pi$ pulse. With an excited medium, a pulse output is a $\pi$ pulse (really, it is either a $\pi^+$ pulse or a $\pi^-$ pulse).

To detect and distinguish $\pi$115 pulses and $\pi^-$ pulses, the pulses are sent through an absorbing (unexcited) medium. Again referring to FIG. 1B, it is apparent that a $\pi^+$ pulse is converted to a $2\pi$ pulse upon passage through an absorbing medium. The $2\pi$ pulse is a physical output and can be detected. On the other hand a $\pi^-$ pulse is converted to a zero pulse upon passage through an absorbing medium. This pulse has an approximately zero amplitude and does not provide an output which can be detected.

Consequently, detection of pulses is obtained merely by using a section of resonant medium as the detecting element. A $2\pi$ pulse is a physically present pulse which can be detected while a zero pulse does not exist. Further, $\pi^+$ pulses can be distinguished from $\pi^-$ pulses merely by passing the pulses through an absorbing media and looking for an output therefrom.

PRACTICAL DEVICE CONSIDERATIONS

As mentioned previously, the input laser pulses to be acted upon must be shorter than the relaxation times of the resonant medium. That is, these pulses must be shorter than both the longitudinal relaxation times $T_1$ and the homogeneous transverse relaxation time $T_2$. The input laser pulse must be of sufficient energy, as mentioned earlier.

With respect to cooling, the logic connectives of this invention do not have to be operated at cryogenic temperatures. Since ultrashort duration pulses are employed as the signal pulses, they will be less than the relaxation times of the resonant medium, even though the medium is not operated at cryogenic temperatures. Of course, the relaxation lifetimes of a medium are longer if the medium is at low temperature and, if required, the medium could be operated at liquid nitrogen temperatures.

With respect to the resonant medium, any medium could be used with any type of traveling wave, as long as the medium is resonant with the frequency of the traveling wave. The interaction could involve magnetic or electric multipole transitions, as long as these transitions are resonant with the input traveling waves.

In order to fabricate logic elements, the component size is chosen. Then the doping levels are adjusted to vary the absorption coefficient. A thin element is one whose length in the direction of the exciting pulse can be totally excited by a $\pi$ pulse.

A thick medium is one which will convert a $\pi$ pulse to a zero or a $2\pi$ pulse. A thick medium is not uniformly excited by the $\pi$ pulse; it converts the $\pi$ pulse to a zero or $2\pi$ pulse, neither of which excites the medium.

An example of a usable medium is ruby. This is a generally easy medium to discuss, since its spectroscopic properties are well known.

The concentration of chromium ions in a two-level medium of ruby is determined by the choice of the absorption length. The absorption coefficient is given by (10) $\leftrightarrow \alpha = (32\pi^4 p^2 T_2^* N)/(nh\lambda)$ where: $N$ is the impurity per unit volume $T_2^*$ is the inhomogenous part of the transverse relaxation time, due to strains in the static crystal field.

Combining equations 8 and 10, the following expression is obtained: (11) $\leftrightarrow 1/\alpha = 4n^2/(3T_2^* N\lambda^2 W)$ Multiplying by $\pi$ gives the units which are used as the abscissa in FIG. 1B. Consequently, this expression relates to the units used in FIG. 1B to the doping level. Since, from FIG. 1B, a thick medium will involve approximately four or five absorption units and a thin medium will involve only a portion (approximately one-fourth) of an absorption length, practical sizes can be established for each of the elements. For instance, if the absorption length $\pi/\alpha$ is chosen to be 2 cm., $N=5\times10^{16}$ ions/cm.$^3$ which corresponds to a $2\times10^{-4}$ percent doped ruby. With this doping, if the sample is ½ cm. thick, the exiting beam transverses only one-fourth of an absorption length in the medium and therefore excites all ions in its path. This is what has been referred to as a "thin" medium. Also, by increasing the doping level, the size of the medium can be reduced arbitrarily without substantially decreasing the homogeneous part of the transverse relaxation time $T_2'$.

With respect to the resonant medium, it is only important that it have levels with an energy separation corresponding to the product of the frequency of the input pulses and Planck's constant. It is preferable to choose a resonant medium having long relaxation times, as the self-induced transparency effect depends upon the duration of the input pulse being less than the relaxation times of the medium.

Although any material can be used, ruby is a very suitable medium. This is so because it has relatively long relaxation times and has suitable energy level separations, to be used with signal pulses produced by a Q-switched ruby laser.

With respect to the initial pump pulse, a Q-switched liquid nitrogen cooled ruby laser is an adequate pulse source. The laser source can be tuned to be resonant with a ruby medium and in particular with the $4A_2(\pm\frac{1}{2}) \leftrightarrow E(2E)$ transition of a ruby resonant medium.

In providing excitation for a resonant medium, a $\pi$ pulse is most suitable. Such a $\pi$ pulse can be obtained from the output of the laser signal source. It is possible to pump a resonant medium by the use of a flash lamp, although this is not as efficient as a coherent laser input pump pulse. Both the pump pulse and the signal pulse can be derived from the same or a different laser. They do not have to be coherent with each other.

For a ruby laser source, with $n$ approximately equal to 1.76, $\lambda$ approximately equal to 6934A, and $W$ approximately equal to $2.5\times10^2$ sec.$^{-1}$, $\tau$ approximately equal to $10^{-8}$ sec., the output power will be approximately 50kw. This is easily obtainable from liquid nitrogen cooled ruby lasers.

In summary then, self-induced transparency involves the interaction of a coherent pulse with pseudodipole moments in a medium which is resonant with the input coherent pulse. Depending upon the thickness of the medium, the input pulse, if it is a $\pi$ pulse, will excite the medium or will be converted to either a zero or a $2\pi$ pulse. The size of the components are chosen so that the self-induced transparency effect will occur within the length of the medium. The input $\pi$ pulses are chosen to have durations less than the relaxation times of the resonant medium and energies equal to the critical energy needed to excite the medium. Because a $\pi$ pulse is differently affected depending upon the state of the resonant medium, logical switching elements are designed utilizing this phenomenon. In addition, to detect and distinguish the changes brought about by the switching element, an analyzing element can also be fabricated from the resonant medium. The combination of these two elements provides a logical connective.

Figure 2A:
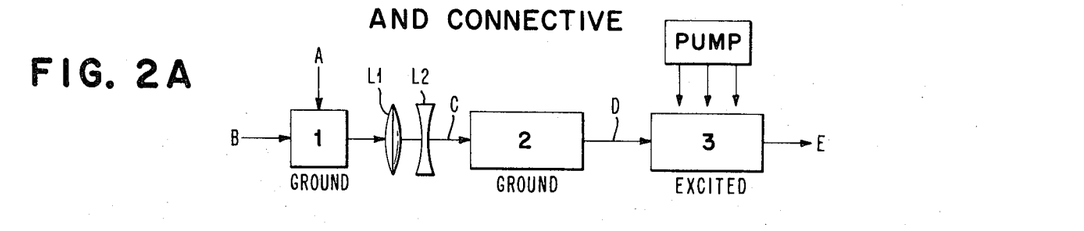
FIG. 2A is a diagram of an AND logical connective according to the instant invention.
Figure 2B:
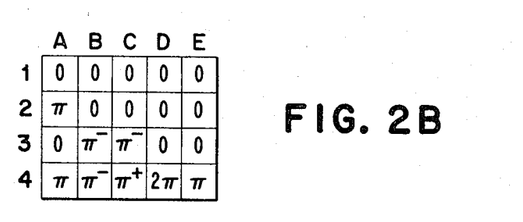
FIG. 2B is a truth table for the AND connective of FIG. 2A.

FIG. 2A is a schematic representation of an AND logical connective, and FIG. 2B is the accompanying truth table. In this figure and in the figures to follow, a thin resonant medium is shown as a square element while a thick resonant medium is an elongated element. Resonant medium 1 corresponds to a switching element while resonant medium 2 corresponds to an analyzing element. Resonant medium 3 is a coupling element and serves only to convert $2\pi$ pulses from the detecting and analyzing medium to $\pi$ pulses so that such pulses can serve as inputs to a succeeding logical connective. If the output of detecting element 2 is not to be used further, resonant medium 3 is not required.

Coherent pulses A and B are the input pulses which are applied consecutively to the originally unexcited thin medium 1. Pulse C is the B pulse as it leaves medium 1. Medium 1 is thin enough such that a $\pi$ A pulse will excite the total length and width of medium 1.

Medium 2 is a thick medium at ground energy. Medium 3 is pumped to an excited level by a pump pulse that need not be related to either input A or input B. The coupling medium 3 is only for providing a $\pi$ pulse output and for amplifying its pulse input (0) so that it will be suitable for use in succeeding logical connectives. Consequently, the pump pulse for medium 3 could be any pulse separate from the logic pulses A and B.

Between switching element 1 and analyzing element 2 is a lens system L1, L2. L1 is a converging lens used to reduce the cross-sectional area of the pulse output from element 1, while L2 is a diverging lens used to make parallel the rays from lens L1.

The purpose of logic pulse A is to excite the thin medium 1. The A pulse must precede the B pulse through medium 1. The amount of delay required for the B pulse is very small, in the order of approximately 1 picosecond. To obtain this delay the B pulse can be transmitted through an extra path length of approximately $L = tc = 10^{-12} \cdot 3 \times 10^{10} = 3 \times 10^{-2}$ cms. As an alternative, a material having a different refractive index can be placed in front of resonant medium 1, so that the B pulse will undergo a delay of approximately 1 picosecond with respect to the A pulse.

DETAILED DESCRIPTION OF THE OPERATION OF THE AND LOGICAL CONNECTIVE

To fully understand the operation of the AND logical connective, reference will be made to FIGS. 1B, 1C, and 2A.

Row 1 of the AND truth table represents a trival case. Here, if neither logic input A nor logic input B is present, there will be no output C pulse. This means that there will be no D pulse and no E pulse.

Row 2 of the truth table illustrates the case when logic pulse A is present but logic pulse B is not present. The A pulse is shown as a $\pi$ pulse, but it can be either a $\pi^-$ or a $\pi^+$ pulse. In row 2, the A pulse serves to excite medium 1 from the ground state to an excited state. Since there is no input B pulse, there will be no C pulse output from switching element 1. This means that there will be no D pulse and no E PULSE.

Row 3 of the truth table represents the case where logic pulse A is absent but logic pulse B is present. Since logic pulse A is not present, logic pulse B will pass through an unexcited thin medium 1. Referring to FIG. 1B, the B pulse will remain as a $\pi^-$ pulse after passage through medium 1. This is because medium 1 is a thin medium less than one absorption length. Actually, the $\pi^-$ pulse will become a $\pi^{--}$ pulse after passing through thin unexcited medium 1. This is seen more clearly by referring to FIG. 2C.

When the $\pi^{--}$ pulse passes through L1, its cross-sectional area is reduced and its energy density is increased. This means that the angle $\theta$ will be increased; consequently, the C pulse is a $\pi^-$ pulse. The function of lens L2 is only to make the rays exiting from lens L1 parallel and aligned with element 2. When the $\pi^-$ C pulse enters the thick, unexcited resonant medium 2, it is converted to an approximately zero pulse (see FIG. 2C). Consequently, the E pulse is also zero.

Figure 2C:
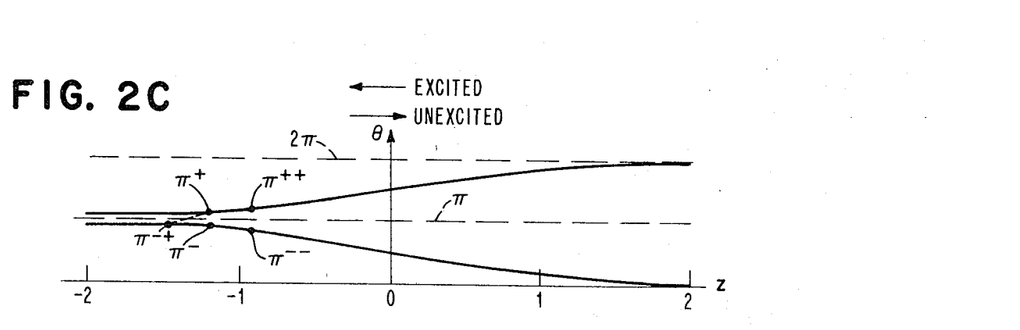
FIG. 2C is a graphical plot similar to that of FIG. 1B, used to explain the operation of the AND connective of FIG. 2A.

Referring to FIG. 2C, row 4 of the AND truth table will now be described. In this row, both logical input A and logical input B are present. For correct operation of the AND logical connective, an output must also be present. As before, the A pulse can be a $\pi^-$ or a $\pi^+$ pulse; it is only necessary that the A pulse excite the thin medium 1.

In medium 1, the $\pi^-$ B pulse increases in angle and becomes a $\pi^{-+}$ pulse. This is illustrated by referring to the lower branch of the solutions shown in FIG. 2C. The presence of a converging lens between medium 1 and medium 2 will decrease the cross-sectional area of the pulse. This means that the $\pi^{-+}$ pulse will be increased in angle and will become a $\pi^+$ pulse. This is the C pulse that enters medium 2.

For a C pulse which is a $\pi^+$ pulse, the C pulse, when travelling through thick unexcited medium 2, will become a $2\pi$ pulse. Hence the D pulse is a $2\pi$ pulse. Hence the D pulse is a $2\pi$ pulse.

When the $2\pi$ D pulse travels through thick excited medium 3 it will, by the upper branch solution shown in FIG. 2C, become a $\pi^+$ pulse. This pulse is then useful as a logical input to a succeeding stage. Of course, the excited medium 3 is used only as a coupling stage when the output of the AND logical connective is to be used as an input to a succeeding stage.

Ideally, the essentially zero pulse will go to a $\pi^-$ pulse upon passage through excited medium 3 (FIG. 2C). However, in practice, the area and amplitude of this pulse are so small that it does not become a $\pi^-$ pulse upon passage through excited medium 3. Of course, a divergent lens could be placed between medium 2 and medium 3 to insure that a $2\pi$ pulse will go to a $\pi^+$ pulse much faster than an essentially zero pulse would go to a $\pi^-$ pulse when both are passed through an excited medium. This reasoning holds true for all logical connections to be described herein, in addition to the AND logical connective presently being discussed.

Although the various elements of the AND logic connective are shown as separate sections, it is to be understood that they could be portions of an integral piece of resonant materials. For instance, sections 2 and 3 could be the front and back half of a single piece of resonant medium, to which is fastened lens system L1, L2 and element 1. This concept of using a single piece of resonant medium applies to any logical connective according to the present invention.

DETAILED DESCRIPTION OF OR LOGICAL CONNECTIVE

Figure 3A:
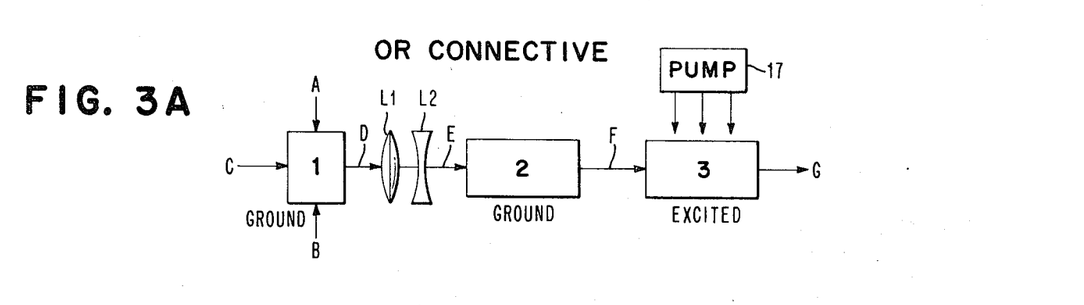
FIG. 3A is a diagram of an OR logical connective, according to the instant invention.
Figure 3B:
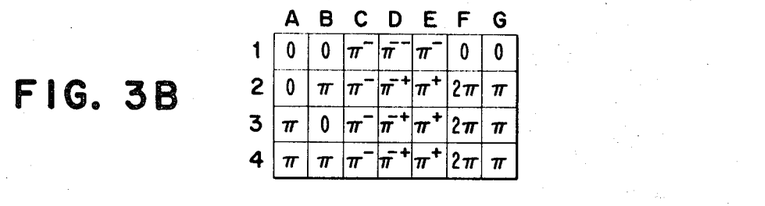
FIG. 3B is a truth table for the OR connective of FIG. 3A.

Referring to FIG. 3A a schematic diagram of an OR logical connective is shown. FIG. 3B shows the truth table for an OR connective.

In FIG. 3A, inputs A and B are the logical input pulses. The C pulses are $\pi^-$ pulses which are fired into switching medium 1 after occurrence of the A and B pulses. Medium 2 is a thick unexcited medium which serves as the detection stage. Medium 3 is a thick excited medium which serves as the coupling stage to another logical connective. Pumping energy to section 3 is provided by the pump 17. As before, if the output of this OR connective is not to be used in a succeeding logical connective, medium 3 is not required. The function of medium 3 is to convert pulses from section 2 to $\pi$ pulses, so that they can be used as logical inputs in succeeding stages.

In FIGS. 3A, medium 1 is thin enough that one $\pi$ pulse can excite most of the atoms therein, but large enough so that $\pi$ pulses from opposite ends do not nullify the effects of each other. (Approximately two absorption lengths are required) Referring to the truth table, row 1, if inputs A and B are not present, the $\pi^-$ C pulse will be changed to a $\pi^{--}$ pulse. The lens system L1, L2 between media 1 and 2 changes the $\pi^{--}$ D pulse into a $\pi^-$ E pulse. When the $\pi^-$ E pulse passes through thick, unexcited medium 2, it becomes an approximately zero pulse. Hence pulse F is an approximately zero pulse, as is pulse G.

With row 2, row 3, and row 4 of the truth table, at least one of the inputs A or B is present. This means that a $\pi^-$ C pulse changes to a $\pi^{-+}$ pulse upon passage through switching medium 1. The lens system between media 1 and 2 changes the $\pi^{-+}$ pulse into a $\pi^+$ pulse (E). Upon passage through detection medium 2, the E pulse will increase in angle to a $2\pi$ pulse which is detectable. After passage through the coupling medium 3, such $2\pi$ pulses are changed to $\pi$ pulses.

As with the AND connective, various portions of the OR conductive can be realized with a single piece of resonant material.

DETAILED DESCRIPTION OF NOT LOGICAL CONNECTIVE

Figure 4A:
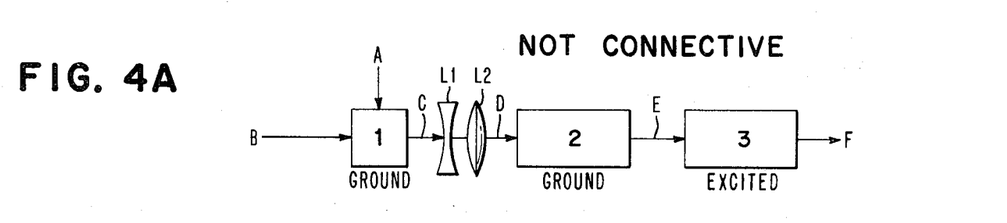
FIG. 4A is a diagram of a NOT logical connective according to the instant invention.
Figure 4B:
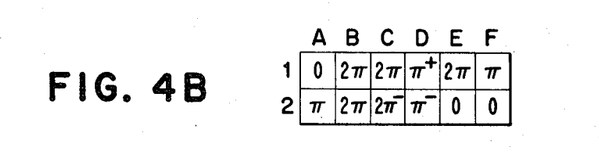
FIG. 4B is a truth table for the NOT connective of FIG. 4A.

Referring to FIG. 4A, a schematic diagram of a NOT logical connective is shown. Its truth table is shown in FIG. 4B. In this connective, switching medium 1 is a thin unexcited medium, whereas the detection medium 2 is thick. Coupling medium 3, used when the output of the NOT connective is to be coupled to another logical connective, is a thick excited medium. The input pulses are the A pulses, while the B pulses are $2\pi$ pulses which are fired into switching medium 1 after incidence of an A pulse. Delay can be achieved by making the B pulse travel a longer path than pulse A before incidence upon switching medium 1. The amount of delay required is approximately 1 picosecond.

A diverging lens L1 and a converging lens L2 are located between media 1 and 2. The diverging lens increases the cross-sectional area of the pulse, thus decreasing its angle $\theta$, while the converging lens L2 makes the rays exiting from L1 parallel before entering medium 2.

Referring to row 1 of the truth table in FIG. 4B, if the A pulse is not present, switching medium 1 will remain in the ground state. The B pulses are $2\pi$ pulses. These pulses do not excite a resonant medium but are only retarded by such medium. Hence, the B pulse is only delayed upon passing through unexcited switching medium 1 and the C pulse is also a $2\pi$ pulse. Upon passing through a divergent lens system the pulse is changed into a $\pi^+$ pulse. When the $\pi^+$ D pulse passes through unexcited detection medium 2, it becomes a $2\pi$ pulse. Upon passage through an excited thick medium, however, a $2\pi$ pulse will be converted into a $\pi$ pulse, as can easily be seen by referring to FIG. 1B. Hence, the logical output E is a $\pi$ pulse suitable for usage in succeeding stages.

Referring to row 2 of the truth table of FIG. 4B, if the A pulse is present, it will excite switching medium 1. When the $2\pi$ B pulse then passes through excited thin medium 1, it will be converted to a $2\pi^-$ C pulse, as can be seen by again referring to FIG. 1B. When this pulse is passed through the divergent lens system the C pulse changes into a $\pi^-$ pulse.

When the $\pi^-$ D pulse is passed through a thick unexcited medium 2, it will become an approximately zero pulse. Hence the E pulse will also be a zero pulse.

DETAILED DESCRIPTION OF EXCLUSIVE OR

Figure 5A:
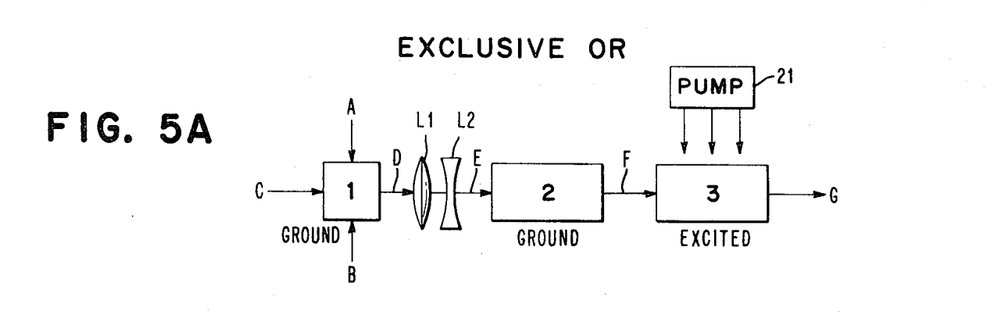
FIG. 5A is a diagram of an EXCLUSIVE OR logical connective according to the instant invention.

Referring to FIG. 5A, an EXCLUSIVE OR logical connective is shown. The truth table for this connective is shown in FIG. 5B.

In FIG. 5A, the switching medium 1 is a resonant two-level medium which is thin in the direction of the A and B pulses. The detection medium 2 is a thick unexcited medium while the coupling stage 3 is a thick excited medium. Excitation for coupling stage 3 is provided by pump 21. As before, the coupling stage is not required if the output pulses F are not to be utilized in a succeeding logical connective. The pumping radiation for stage 3 is separate from the input pulses A, B, and C. Lens L1, L2 are provided between media 1, 2. Their function is the same as that described previously with respect to the AND logical element.

The input pulses A and B are pulses whose purpose is to excite the switching medium 1, while the C pulses are $\pi^-$ pulses whose development determines the nature of the output pulse E. In this respect, this logical connective is quite similar to the OR logical connective shown in FIGS. 3A, B. The difference between the EXCLUSIVE OR connective described here and the OR connective described previously is that here switching medium 1 is thin in the direction of the pulses A and B. Because switching medium 1 is thin in this direction, if both the A and B pulses are present as $\pi$ pulses, or if both A and B are zero pulses, medium 1 is left in the ground state after both A and B have passed. If only one of these pulses is present, switching medium 1 will be put in an excited state.

Figure 5B:
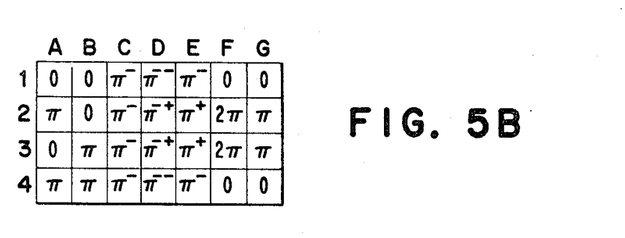
FIG. 5B is a truth table for the EXCLUSIVE OR connective of FIG. 5A.

Referring to row 1 of the truth table of FIG. 5B, if pulses A and B are not present, medium 1 will be left unexcited. This means that an incident $\pi^-$ C pulse will lose energy in passage through the thin medium 1 and will exit as a $\pi^{--}$ pulse (D). The passage of this pulse through a convergent lens system turns it into a $\pi^-$ E pulse. The $\pi^-$ E pulse, upon passage through thick, unexcited medium 2, will lose energy and will become an approximately zero pulse (F) as can be seen by reference to FIG. 1B. Consequently, the G pulse will also be a zero pulse.

Referring to row 2 of the truth table, here the A pulse is a $\pi$ pulse while the B pulse is a zero pulse. The A pulse will excite the switching medium 1 so that subsequent incidence of a $\pi^-$ C. pulse will give rise to a $\pi^{-+}$ pulse as the D pulse. Passing through the convergent lens system the D pulse will turn into a $\pi^+$ pulse (E). When the $\pi^+$ E pulse is incident upon thick, unexcited medium 2, it will become a $2\pi$ pulse (F), as is apparent from FIG. 1B. When the $2\pi$ F pulse travels through a thick excited medium such as the coupling medium 3, it becomes a $\pi$ pulse, as can be seen from FIG. 1B. Hence, the G pulse is a $\pi$ pulse.

Referring to row 3 of the truth table, the A pulse is a zero pulse while the B pulse is a $\pi$ pulse. This is the same case as was described in row 2. That is, the presence of the B pulse serves to excite the thin medium 1 so that a C pulse will change into a $\pi^+$ E pulse. Its travel through detection medium 2 and coupling medium 3 is identical to that of the pulses of row 2 and need not be explained again.

Row 4 of the truth table illustrates the case when both logical input A and logical input B are present. As was stated previously, if both A and B are $\pi$ pulses, the medium is left in the ground state after both A and B pass therethrough. That is, the presence of both of these pulses nullifies the effect caused by each. This means that, when a $\pi^-$ C pulse enters unexcited medium 1, it will be converted to a $\pi^{--}$ pulse. Hence the D pulse is a $\pi^{--}$ pulse which, upon passage through the convergent lens system will turn into a $\pi^-$ pulse. When passing through the thick, unexcited medium 2, it will become an approximately zero pulse. Therefore, the F pulse is a zero pulse as is the G pulse.

DETAILED DESCRIPTION OF BINARY HALF-ADDER

The simplest possible elementary arithmetical operation performed by a binary computer is the half-addition operation.

Figure 6A:
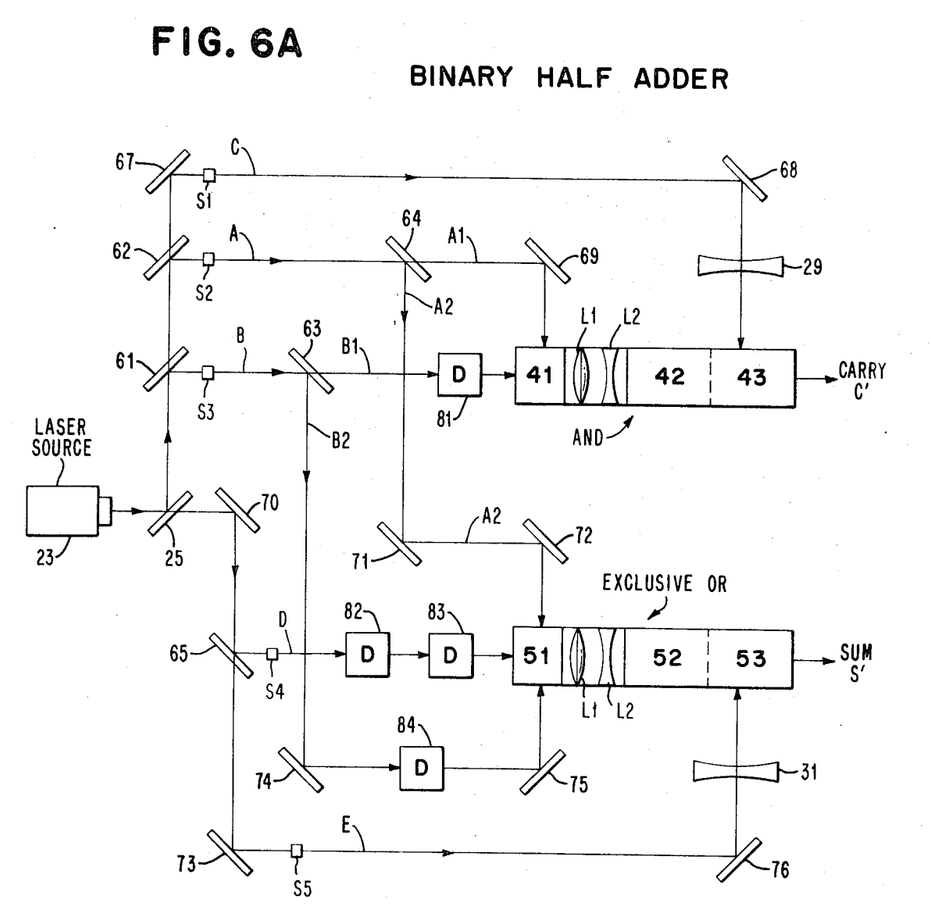
FIG. 6A illustrates a binary half-adder according to the instant invention.
Figure 6B:
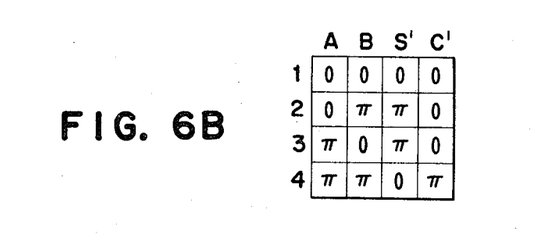
FIG. 6B is a truth table for the half-adder of FIG. 6A.

FIG. 6A shows the schematic of a binary half-adder according to the principles of this invention. FIG. 6B shows a truth table for the binary half-adder. The S' column of the truth table corresponds to the sum digit and the C' column corresponds to the carry digit.

In very general terms, the input laser pulse is divided into 7 $\pi$ pulses. Three (A1, A2, C) are directed toward the carry element which is an AND gate. The other four pulses (A2, B2, D, and E) are directed toward the sum element which is an EXCLUSIVE OR gate. Pulses C, and E are used as pump pulses to provide amplification. In the carry element the A1 and C pulses must precede the B1 pulse. In the sum gate the A2 and E pulses must precede the B2 pulse, which in turn precedes the D pulse. These timings can be synchronized by adjusting the distances through which the pulses travel, or by including a material of different index in the path of the pulse to be delayed.

In more detail, laser 23 produces an input pulse which is divided by a beam splitter 25. As a particular example, the input pulse can be an 11$\pi$ pulse (a $\pi$ pulse will turn the pseudodipole moment one-half turn). Since the C pulse and B pulse are used to excite thick media, diverging lenses 29, 31 are used to spread the C and E pulses so that they will excite the total length through which the signal pulse travels. That is, the C pulse excites the entire length of the coupling stage 43 of the AND connective, while the E pulse excites the entire length of the coupling stage 53 of the EXCLUSIVE OR logical connective.

When a pulse is divided, as by a beam splitter, it is the power that is divided, not the angle. The energy of the input laser pulse can be chosen to have a power corresponding to that of 11 $\pi$ pulses, since power is proportional to the square of angle $\theta$.

Since the lenses 29, 31 diverge pulses C and E, it is proper to make C and E 3$\pi$ pulses. All other pulses have maximum energies equivalent to that of a $\pi$ pulse. Accordingly, the pulses to be used are the following:

A1-$\pi$
A2-$\pi$
B1-$\pi$
B2-$\pi$
C-3$\pi$
D-$\pi$
E-3$\pi$.

This corresponds to the input power of 11 $\pi$ pulses.

Beam splitters can be adjusted so that different percentages of energy will be diverted. With this in mind, the first beam splitter 25 divides the input 11$\pi$ laser pulse so that the power of the A, B, and C pulses in total, is equal to that of 7 $\pi$-pulses. The total power of the D pulse and E pulse is equivalent to that of 4 $\pi$-pulses. All other beam splitters 61–65 divide the input pulses equally into a $\pi$ output pulses.

Mirrors 67–76 are just for guiding the beams to proper locations. Delay elements 81–84 are for providing the necessary delays of the signal pulses with respect to the excitation pulses. Optical switches S1–S5 are conventional light valves which block light or let it pass depending on the condition of the switch. These switches control the presence of pulses A, B, C, D and E, and thereby control the input pulses to the AND logical connective and the EXCLUSIVE OR logical connective. Of course, the inputs to these logical connectives could be derived from previous logical connectives, as would usually be the case in a large logical processing system.

Referring to row 1 of the truth table, if there is no input from laser 23, the pulses A-E are zero. Since there is then no B1 pulse, no output will be provided from the AND logical connective. This will mean that there will be no carry C' output. Also, since there is no D pulse, there will be no sum S' pulse from the EXCLUSIVE OR connective. In this discussion, the AND operation and the EXCLUSIVE OR operation are not described in detail, since these have been previously described.

Referring to row 2 of the truth table, if the A pulse is zero, but the B pulse has power equivalent to 2 $\pi$ pulses, then the B1 pulse is a $\pi$ pulse and the B2 pulse is also a $\pi$ pulse. The switching medium 41 in the AND logical connective will be unexcited since the A1 pulse is absent. Referring to FIG. 2B, it is readily apparent that, with the B1 pulse present and no A1 pulse, there will be no output from the AND connective. This will mean that the carry C' will be zero.

Since, in row 2, the power of the B pulse is equivalent to the power of 2 $\pi$ pulses, the B2 pulse will be a $\pi$ pulse which will excite the switching medium 51 of the EXCLUSIVE OR connective. Referring to FIG. 5B, if the signal pulse C is present, and the switching medium 51 is in an excited state due to the B2 pulse, there will be an output from the EXCLUSIVE OR connective. This means that the sum pulse S' is a $\pi$ pulse.

Referring to row 3 of the truth table of FIG. 6B, if the A pulse has a power equivalent to that of 2 $\pi$pulses while the B pulse is zero, A1 will be a $\pi$ pulse and A2 will be a $\pi$ pulse while the B1 and B2 pulses will be zero pulses. Again, this means that there will no output from the AND logical connective and that the carry C' will be a zero pulse.

However, there will be excitation of the switching medium 51 of the EXCLUSIVE OR connective, as was the case with the inputs listed in row 2. That is, the A2 pulse will excite switching medium 51 of the EXCLUSIVE OR connective and a $\pi$ D pulse will be become a $\pi$ pulse at the output of the EXCLUSIVE OR. Therefore, the sum S' pulse will be a $\pi$ pulse.

Referring to row 4 of the half-adder truth table, it is assumed that both the A and B pulses are present. This means that there will be an output (C') from the AND logical connective since both A1 and A2 are present.

However, with the EXCLUSIVE OR connective, the presence of A2 and B2 means that there will be no sum S' output from the EXCLUSIVE OR connective. Again, this is more clearly seen by referring to the truth table of the EXCLUSIVE OR connective, shown in FIG. 5B. Specifically, row 4 of that truth table describes the case where both the A and B excitation pulses are present.

FIG. 6A shows a binary half-adder which uses a laser 23 to provide all of the input pulses. Of course, it is obvious that the various pulses A1, A2, B1, B2, D could be outputs from previous logical connectives. Also, the C and E pulses need not be derived from the laser 23, but can be any pulses which will excite coupling medium 43 in the AND logical connective and coupling medium 53 in the EXCLUSIVE OR logical connective, respectively.

Further, in order to provide an A and B pulse, while not providing any other pulses, switching means could be provided in the optical paths of these pulses in order to obtain the desired input combination. What is fundamental is that this circuit will provide the binary half-adder operation, for any combination of inputs A1, A2, B1, B2, and D.

What has been described and illustrated here is a series of logical connectives and an arithmetic unit (binary half-adder) which utilizes these logical connectives. In all cases, the logical connective operates on ultrashort laser pulses, according to the self-induced transparency effect. Although the logical connectives described were the AND, NOT, OR, and EXCLUSIVE OR gates, it is to be understood that various other logical connectives, such as NAND, NOR, etc., can be constructed in a similar manner. The same basic principles are utilized to design other logical connectives and to combine these connectives to produce arithmetic units.

The particular arithmetic unit chosen is one which utilizes the most commonly used logical connectives. However, it is also possible to provide complete logical connectives using only NAND gates. The principles underlying this invention would easily serve to enable one to design any of these other logical connectives and to combine them in any fashion.

What is claimed is the following:
1. A logical connective, comprising:
   a source of input optical pulses, having certain characteristics;
   a multilevel medium resonant to the frequency of said input optical pulses, said medium having relaxation times long compared with the width of said input pulses, said optical pulses interacting with said resonant medium to rotate the pseudodipole moments of said resonant medium upon passage therethrough, whereby the characteristics of said optical pulses are changed, said resonant medium having a switching portion which changes the angle of said input optical pulses and an analyzing portion which distinguishes the output pulses from said switching portion, said analyzing portion comprising a multienergy level medium in an unexcited state, and a lens system for changing the characteristics of pulses which exit from said switching portion.

2. The logical connective of claim 1, further including coupling means for coupling the output optical pulses from said analyzing portion to a succeeding logical connective.

3. The logical connective of claim 1, including means for optically biasing said switching portion into an excited state.

4. The logical connective of claim 1, where said optical pulses are approximately $\pi$ pulses.

5. A logical connective using coherent optical pulses as input logic pulses, comprising:
a medium resonant with said optical pulses having relaxation times that are long compared with the width of said optical pulses, said medium having a switching portion capable of being optically biased to an excited state and analyzing portion for distinguishing optical pulses exiting from said switching portion, said input optical pulses interacting with the pseudodipole moments of said resonant medium to rotate said pseudodipole moments when passing through said resonant medium, wherein said optical pulses are approximately $\pi$ and 0 pulses.

6. A logical connective using coherent optical pulses as input logic pulses, comprising:
a medium resonant with said optical pulses having relaxation times that are long compared with the width of said optical pulses, said medium having a switching portion capable of being optically biased to an excited state and an analyzing portion for distinguishing optical pulses exiting from said switching portion, said input optical pulses interacting with the pseudodipole moments of said resonant medium to rotate said pseudodipole moments when passing through said resonant medium, where said resonant medium also comprises a coupling portion for converting the optical pulses from said analyzation portion to approximately $\pi$ pulses and for coupling said $\pi$ pulses from said analyzation portion to a succeeding logical connective.

7. A logical connective using coherent optical pulses as input logic pulses, comprising:
a medium resonant with said optical pulses having relaxation times that are long compared with the width of said optical pulses, said medium having a switching portion capable of being optically biased to an excited state and an analyzing portion for distinguishing optical pulses exiting from said switching portion, said input optical pulses interacting with the pseudodipole moments of said resonant medium to rotate said pseudodipole moments when passing through said resonant medium, where said switching portion is thin in the direction of the input optical pulses, said switching portion being of such a length and width that a $\pi$ pulse passing therethrough will be substantially unchanged in angle, said pulses exciting the entire switching portion upon passage therethrough, and said analyzation portion is thick in the direction of said input pulses, said thickness being sufficient that the angle of a pulse passing therethrough is substantially changed, said pulse not exciting said analyzation portion.

8. A logical connective using coherent optical pulses as input logic pulses, comprising:
a medium resonant with said optical pulses having relaxation times that are long compared with the width of said optical pulses, said medium having a switching portion capable of being optically biased to an excited state and an analyzing portion for distinguishing optical pulses exiting from said switching portion, said input optical pulses interacting with the pseudodipole moments of said resonant medium to rotate said pseudodipole moments when passing through said resonant medium, where said switching portion is totally excited upon passage of a $\pi$ pulse therethrough and said analyzation portion is not totally excited upon passage of a $\pi$ pulse therethrough.

9. A logical connective using coherent optical pulses as input logic pulses, comprising:
a medium resonant with said optical pulses having relaxation times that are long compared with the width of said optical pulses, said medium having a switching portion capable of being optically biased to an excited state and an analyzing portion for distinguishing optical pulses exiting from said switching portion, said input optical pulses interacting with the pseudodipole moments of said resonant medium to rotate said pseudodipole moments when passing through said resonant medium, where said switching portion has such a thickness that sequential $\pi$ pulses in opposite directions will not nullify the effect of one another in said switching portion.

10. A logical connective using coherent optical pulses as input logic pulses, comprising:
a medium resonant with said optical pulses having relaxation times that are long compared with the width of said optical pulses, said medium having a switching portion capable of being optically biased to an excited state and an analyzing portion for distinguishing optical pulses exiting from said switching portion, said input optical pulses interacting with the pseudodipole moments of said resonant medium to rotate said pseudodipole moments when passing through said resonant medium, wherein said switching portion is less than approximately one absorption length for said optical pulses and said analyzing portion is approximately four absorption lengths for said optical pulses.

11. An arithmetic unit for performing binary operations utilizing optical pulses, comprising:
at least two optical logic connectives each of which comprises a medium resonant to said optical pulses, said medium having relaxation times greater than the width of said optical pulse;
means for guiding said optical pulses to selected portions of said logic connectives, wherein some optical pulses are transmitted through said connectives as signal pulses representing binary digit values, while other optical pulses are bias pulses for biasing various portions of said resonant media to excited states, wherein said logic connectives are an EXCLUSIVE OR connective and AND logical connective, said arithmetic unit operating to perform binary half addition.

12. An arithmetic unit for performing binary operations utilizing optical pulses, comprising:
at least two optical logic connectives each of which comprises a medium resonant to said optical pulses, said medium having relaxation times greater than the width of said optical pulses;
means for guiding said optical pulses to selected portions of said logic connectives, wherein some optical pulses are transmitted through said connectives as signal pulses representing binary digit values, while other optical pulses are bias pulses for biasing various portions of said resonant media to excited states, wherein said binary pulses are substantially $\pi$ pulses and said resonant media has a first portion which is less than approximately one absorption length and a second portion which is approximately four absorption lengths in the direction of said binary valued pulses.

13. An arithmetic unit for performing binary operations utilizing optical pulses, comprising:
at least two optical logic connectives each of which comprises a medium resonant to said optical pulses, said medium having relaxation times greater than the width of said optical pulses;

means for guiding said optical pulses to selected portions of said logic connectives, wherein some optical pulses are transmitted through said connectives as signal pulses representing binary digit values, while other optical pulses are bias pulses for biasing various portions of said resonant media to excited states, further including delay means for delaying said signal pulses with respect to said bias pulses.

14. An arithmetic unit for performing binary operations utilizing optical pulses, comprising:

at least two optical logic connectives each of which comprises a medium resonant to said optical pulses, said medium having relaxation times greater than the width of said optical pulses;

means for guiding said optical pulses to selected portions of said logic connectives, wherein some optical pulses are transmitted through said connectives as signal pulses representing binary digit values, while other optical pulses are bias pulses for biasing various portions of said resonant media to excited states, where said resonant medium has a width in the direction of said bias pulses such that said bias pulses excite the entire width of said resonant medium.

15. A logical connective having coherent optical pulses as input signal pulses, thereto comprising:

switching means comprising a first resonant medium for said optical pulses having relaxation times greater than the duration of said input signal pulses, for changing the angle of said optical pulses representative of the rotation of pseudodipole moments within said medium;

bias means for biasing said first medium into an excited energy state;

analyzing means for distinguishing signal pulses exiting from said first medium on the basis of said representative angles, said analyzing means comprising a second resonant medium having relaxation times greater than the duration of said optical signal pulses wherein said second resonant medium is in an unexcited state and of sufficient length to change the angle of signal pulses exiting from said switching means.

16. The logical connective of claim 15, wherein said analyzing means also comprises a lens system for changing the cross-sectional area of said signal pulses before said signal pulses enter said second resonant medium.

17. The logical connective of claim 16, wherein said first resonant medium does not substantially change said representative angle of input signal pulses, and said second resonant means does substantially change said representative angle of signal pulses passing therethrough.

* * * * *